Nov. 30, 1926.  1,608,771

H. CARY

HEIGHT MEASURING DEVICE FOR PERSONS

Filed Nov. 12, 1923

Inventor
HUNSDON CARY

By

Attorney

Patented Nov. 30, 1926.

1,608,771

UNITED STATES PATENT OFFICE.

HUNSDON CARY, OF RICHMOND, VIRGINIA.

HEIGHT-MEASURING DEVICE FOR PERSONS.

Application filed November 12, 1923. Serial No. 674,275.

This invention relates to measuring devices and more particularly to a device of an extremely simple nature whereby the heights of growing children may be determined at intervals of time and a suitable record made of the measurements which may be preserved.

An important object of the invention is to provide such a device whereby a record of the growth of children may be made and preserved for any desired purpose, such as determining a normalcy of growth.

Other objects and advantages of the invention will become apparent during the course of the following description.

In the drawings I have shown one embodiment of the invention. In this showing:

Figure 1:
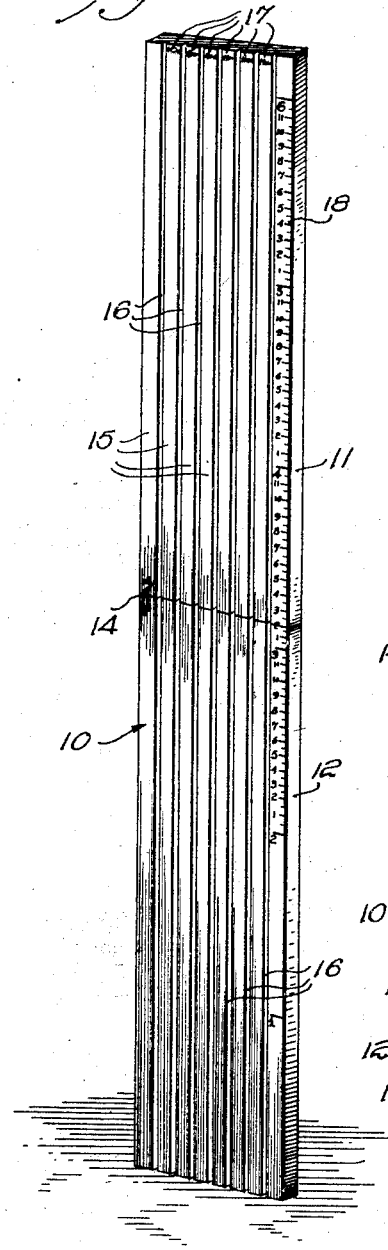
Figure 1 is a perspective view of the device complete in operative position.

Referring to the drawings, the numeral 10 designates the body portion of the device as a whole, comprising upper and lower sections 11 and 12. The upper and lower sections are similarly shaped in cross-section to form continuations of each other and their adjacent ends are provided with hinges 13 whereby the device may be opened when in use and folded to be packed away when not in use. A latch or suitable fastening device 14 is provided upon the face of the body portion for maintaining the device in open position when in operation.

Figure 2:
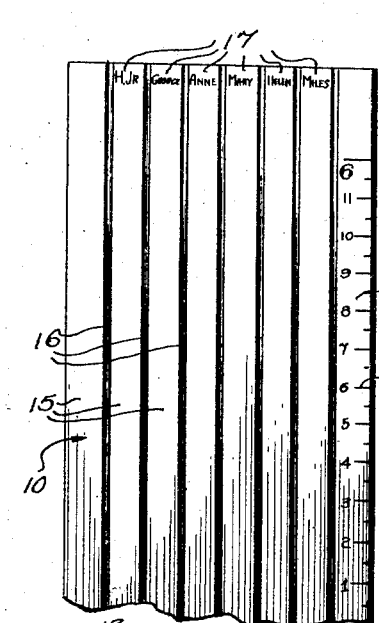
Figure 2 is an enlarged fragmentary face view of the upper end of the device.
Figure 3:
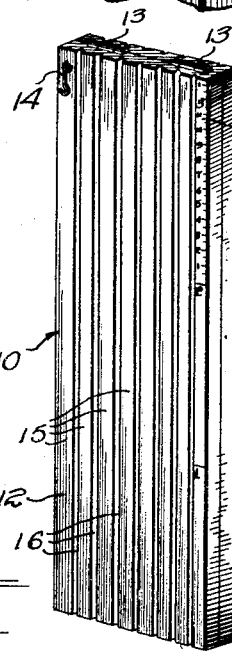
Figure 3 is a view similar to Figure 1 showing the device folded.
Figure 4:
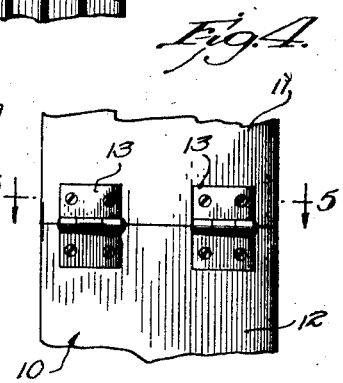
Figure 4 is a fragmentary rear elevation of the hinged ends of the sections of the device, and, Figure 5 is a section taken on line 5—5 of Figure 4.
Figure 5:
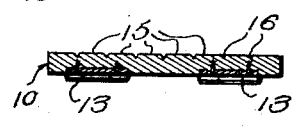

One side of the body portion 10 is provided with a plurality of panels 15 provided in the present instance by longitudinally grooving the sections 11 and 12 as shown at 16. These grooves are continuous throughout the length of the sections 11 and 12 as shown in Figure 1. While I have shown the panels as being formed by spaced longitudinal grooves, it will be apparent that any suitable means may be employed for marking off the panels, such as by painted lines. Any suitable number of panels may be employed and the upper ends of some of the panels are provided with names of the children of a family, preferably the given names, as indicated at 17. One of the panels, preferably one of the outer panels is provided with a suitable scale 18, preferably calibrated in feet and inches as shown in Figures 1, 2 and 3.

The sections 11 and 12 may be provided upon their faces opposite the panels 15 with any approved scale of normal heights for given ages (not shown).

The operation of the device is as follows:

The sections 11 and 12 are opened and latched as shown in Figure 1 of the drawings. The device is then placed adjacent the child to be measured with the panelled side toward the child. The height of the child is then marked on the panel corresponding to the name of the child and the date upon which the measurement was taken is indicated adjacent the line marking the height. In place of the date it will be apparent that the age of the child in years and months may be used. The measurement of each child of the family may be taken at any desired intervals of time so that an accurate record of their growth may be preserved as a matter of interest for future reference or to determine the degree of normalcy of their growth.

While I have illustrated the device as being formed of a pair of sections, it will be apparent that it may be formed of any suitable number of sections whereby it may be folded up and packed away in a limited space. The device may be formed of any suitable material, such as pressed metal, wood or wood fibre.

It is to be understood that the form of the invention herewith shown and described is to be taken as a preferred example of the same, and that various changes in the shape, size and arrangement of parts may be resorted to without departing from the spirit of the invention or the scope of the subjoined claim.

Having thus described my invention, I claim:

A device of the character described comprising a relatively flat broad body portion formed of a pair of rigid sections normally vertically arranged in end to end relation, hinges connecting the adjacent ends of said sections, each of said sections being provided upon one side with spaced parallel grooves alined with the grooves of the other sections to form continuous panels, one of said panels being provided with a scale, the others of said panels being blank throughout the greater portion of their length and provided at one end with the names of persons to be periodically measured, and means for locking said sections in normal position.

In testimony whereof I affix my signature.

HUNSDON CARY.